United States Patent
Park (10) Patent No.: US 9,509,169 B2
(45) Date of Patent: Nov. 29, 2016

(54) WIRELESS CHARGING DEVICE AND CONTROL METHOD THEREOF

(71) Applicant: SAMSUNG ELECTRO-MECHANICS CO., LTD., Suwon, Gyunggi-do (KR)

(72) Inventor: Sung Heum Park, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 262 days.

(21) Appl. No.: 14/163,800

(22) Filed: Jan. 24, 2014

(65) Prior Publication Data
US 2015/0115879 A1 Apr. 30, 2015

(30) Foreign Application Priority Data
Oct. 31, 2013 (KR) .................. 10-2013-0131162

(51) Int. Cl.
*H02J 7/00* (2006.01)
*H02J 7/02* (2016.01)
*H02J 17/00* (2006.01)

(52) U.S. Cl.
CPC ................ *H02J 7/025* (2013.01); *H02J 17/00* (2013.01)

(58) Field of Classification Search
CPC .......... H02J 7/025; H02J 5/005; H02J 17/00; H02J 7/0042; H02J 7/00; H02J 7/0004; H02J 7/0027; H02J 7/0052; H02J 7/0013; H02J 7/0044; H02J 7/0054; H02J 7/0029; H02J 7/04; H02J 2007/0001; H02J 50/12; H02J 50/10; H02J 2007/0096; H02J 50/80; H02J 50/40; H02J 7/045; H02J 50/23
USPC .................................................. 320/106–115
See application file for complete search history.

(56) References Cited

U.S. PATENT DOCUMENTS

| 8,903,456 | B2 * | 12/2014 | Chu ...................... H04M 19/04 320/106 |
| 2010/0156343 | A1 * | 6/2010 | Jung ...................... H02J 5/005 320/108 |
| 2011/0140671 | A1 | 6/2011 | Kim et al. |
| 2012/0214462 | A1 * | 8/2012 | Chu ...................... H04M 19/04 455/418 |
| 2013/0076306 | A1 | 3/2013 | Lee et al. |
| 2014/0210406 | A1 | 7/2014 | Na et al. |

FOREIGN PATENT DOCUMENTS

| KR | 10-2011-0055903 A | 5/2011 |
| KR | 10-2011-0066827 A | 6/2011 |
| KR | 10-2013-0024757 A | 3/2013 |
| KR | 10-2013-0033867 A | 4/2013 |

OTHER PUBLICATIONS

Office Action issued on Dec. 29, 2014 issued in Korean Patent Application No. 10-2013-0131162 (English translation).

* cited by examiner

*Primary Examiner* — Binh Tat
(74) *Attorney, Agent, or Firm* — NSIP Law (57) ABSTRACT

There are provided a wireless charging device and a control method thereof, the wireless charging device including: a first receiving module receiving power from the outside in a magnetic induction scheme to thereby charge a battery; a second receiving module receiving power from the outside in a magnetic resonance scheme to thereby charge the battery; a switching unit performing a switching operation at a preset interval such that one of the first receiving module and the second receiving module is selected; and a switching controlling unit receiving a stop signal or an operating signal from one of the first receiving module and the second receiving module to thereby control the switching operation of the switching unit.

10 Claims, 6 Drawing Sheets

WIRELESS CHARGING DEVICE AND CONTROL METHOD THEREOF

CROSS-REFERENCE TO RELATED APPLICATIONS

This application claims the benefit of Korean Patent Application No. 10-2013-0131162 filed on Oct. 31, 2013, with the Korean Intellectual Property Office, the disclosure of which is incorporated herein by reference.

BACKGROUND

The present disclosure relates to a wireless charging device and a control method thereof.

Recently, cellular phones and personal portable electronic products with many additional functions have been released onto the market while maintaining an ultra-slim form. In order for the personal portable electronic product to be actuated, a power source such as a battery is necessary therein. Therefore, in the case of personal portable electronic products, battery use times, charging matters, and the like must be necessarily considered as important factors.

Meanwhile, in order to provide a user with a degree of freedom with respect to battery charging, the introduction of wireless charging technology has recently been promoted by cellular phone manufacturers. In this case, representative examples of wireless charging schemes include a microwave receiving-type scheme using microwaves, a magnetic induction scheme using a magnetic field and a magnetic resonance scheme utilizing energy switching between a magnetic field, and an electrical field, and the like.

Here, in the microwave receiving-type scheme, power may be transmitted for a relatively long distance through microwaves being radiated in the atmosphere using an antenna, but significant radiation loss may occur, to thereby limit the efficiency of power transmission.

Meanwhile, in the case of the magnetic induction scheme and the magnetic resonance scheme, the respective technological standard associations therefor have been established. In the case of the magnetic induction scheme, a resonance frequency of 110 KHz to 282 KHz is used, and in the case of the magnetic resonance scheme, a resonance frequency of 6.78 MHz and 13.56 MHz is used. That is, due to the different resonance frequencies of the respective schemes and a communications protocol difference, the wireless charging schemes are incompatible with each other.

The following Patent Document 1, the related art document, relates to a wireless power transmission system selectively using a magnetic induction scheme or a magnetic resonance scheme depending on distance. That is, Patent Document 1 does not disclose a wireless charging device which may be operated in both respective technological standards in a time division multiplexing (TDM) scheme through a switching operation.

RELATED ART DOCUMENT (Patent Document 1) Korean Patent Laid-Open Publication No. 10-2013-0033867

SUMMARY

An aspect of the present disclosure may provide a wireless charging device capable of being operated using respective technological standards of a magnetic resonance scheme and a magnetic induction scheme by receiving a stop signal or an operating signal from a receiving module to control a switching operation of a switching unit, and a control method thereof.

According to an aspect of the present disclosure, a wireless charging device may include: a first receiving module receiving power from the outside in a magnetic induction scheme to thereby charge a battery; a second receiving module receiving power from the outside in a magnetic resonance scheme to thereby charge the battery; a switching unit performing a switching operation at a preset interval such that one of the first receiving module and the second receiving module is selected; and a switching controlling unit receiving a stop signal or an operating signal from one of the first receiving module and the second receiving module to thereby control the switching operation of the switching unit.

The first receiving module may compare an operating frequency band of the received power and a preset first frequency band to thereby provide the stop signal to the switching controlling unit when the frequency bands match each other and to provide the operating signal to the switching controlling unit when the frequency bands do not match each other.

The second receiving module may compare an operating frequency band of the received power and a preset second frequency band to thereby provide the stop signal to the switching controlling unit when the frequency bands match each other and to provide the operating signal to the switching controlling unit when the frequency bands do not match each other.

The magnetic induction scheme may be one of a wireless power consortium (WPC) standard and a power matters alliance (PMA) standard.

The magnetic resonance scheme may be an alliance for wireless power (A4WP) standard.

The first receiving module may include: a first rectifier rectifying the received power; first converting unit converting the power received from the first rectifier into an output voltage to provide the output voltage to the battery; and first controlling unit comparing an operating frequency band of the received power and a preset first frequency band to thereby provide one of the operating signal and the stop signal to the switching controlling unit.

The second receiving module may include: a second rectifier rectifying the received power; a second converting unit converting the power received from the second rectifier into an output voltage to provide the output voltage to the battery; and a second controlling unit comparing an operating frequency band of the received power and a preset second frequency band to thereby provide one of the operating signal and the stop signal to the switching controlling unit.

According to another aspect of the present disclosure, a wireless charging device may include: a plurality of receiving modules receiving power from the outside to thereby charge a battery; a switching unit performing a switching operation at a preset interval such that one of the plurality of receiving modules is selected; and a switching controlling unit receiving a stop signal from one of the plurality of receiving modules selected by the switching operation of the switching unit to thereby stop the switching operation of the switching unit, wherein each receiving module among the plurality of receiving modules uses a different communications standard.

The communications standard may be one of an alliance for wireless power (A4WP) standard, a wireless power consortium (WPC) standard and a power matters alliance (PMA) standard.

The switching controlling unit may stop the switching operation of the switching unit when an operating frequency band of the received power matches the communications standard of the receiving module selected by the switching operation of the switching unit.

The switching controlling unit may resume the switching operation of the switching unit when an operating frequency band of the received power does not match the communications standard of the receiving module selected by the switching operation of the switching unit.

The plurality of receiving modules may include: a rectifier rectifying the received power; a converting unit converting the power received from the rectifier into an output voltage to provide the output voltage to the battery; and a controlling unit providing one of an operating signal and the stop signal to the switching controlling unit according to an operating frequency band of the received power.

According to another aspect of the present disclosure, a control method of a wireless charging device may include: receiving external power in a receiving coil; performing a switching operation at a preset interval to thereby connect one of a plurality of receiving modules and the receiving coil to each other; receiving the external power from the receiving coil to thereby provide the external power to the connected receiving module; generating an operating signal or a stop signal by comparing a communications standard of the connected receiving module and an operating frequency band of the external power; and receiving, by the switching controlling unit, the operating signal or the stop signal to thereby control the switching operation.

The generating of the operating signal or the stop signal may include generating a signal stopping the switching operation when a frequency band of the communications standard and the operating frequency band match each other, and generating a signal resuming the switching operation when the frequency band of the communications standard and the operating frequency band do not match each other.

The communications standard may be one of an alliance for wireless power (A4WP) standard, a wireless power consortium (WPC) standard and a power matters alliance (PMA) standard, and each receiving module among the plurality of receiving modules may use a different communications standard.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

Figure 1:
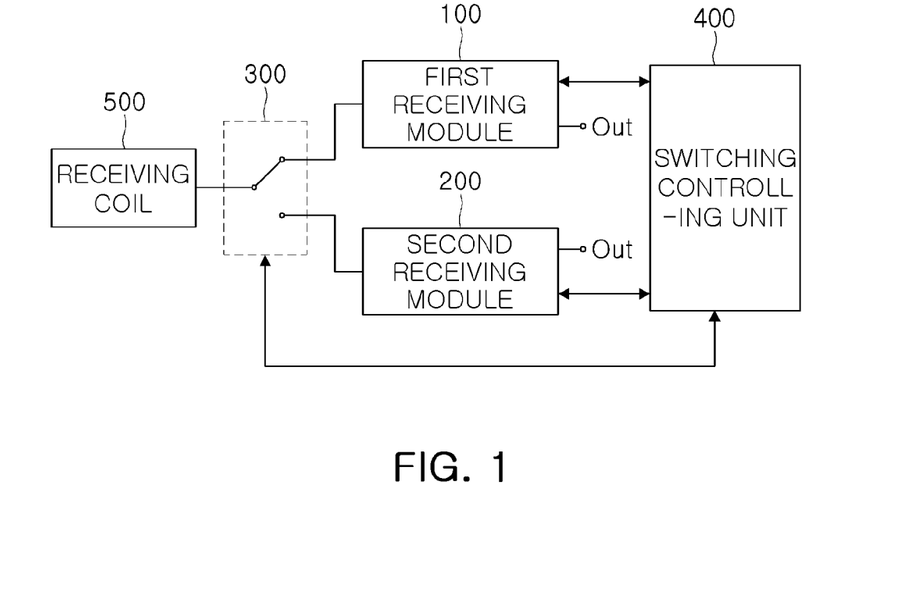
FIG. 1 is a block diagram illustrating a wireless charging device according to an exemplary embodiment of the present disclosure.

FIG. 1 is a block diagram illustrating a wireless charging device according to an exemplary embodiment of the present disclosure.

Referring to FIG. 1, the wireless charging device according to an exemplary embodiment of the present disclosure may include a first receiving module 100, a second receiving module 200, a switching unit 300, a switching controlling unit 400, and a receiving coil 500.

The receiving coil 500 may receive power from the outside. In this case, the power received from the outside may be power received from a transmitter of a wireless charging system, for example. The power received from the transmitter may be high frequency power of about several tens KHz to several tens MHz.

In this case, the first receiving module 100 may receive the power in a magnetic induction scheme to thereby charge a battery. The magnetic induction scheme may be one of a wireless power consortium (WPC) standard and a power matters alliance (PMA) standard.

The second receiving module 200 may receive the power in a magnetic resonance scheme to thereby charge the battery. The magnetic resonance scheme may be an alliance for wireless power (A4WP) standard.

Meanwhile, the battery may be a battery used in a portable wireless terminal, or the like.

The switching unit 300 may perform a switching operation at a preset interval such that one of the first receiving module 100 and the second receiving module 200 may be selected.

The switching controlling unit 400 may receive a stop signal or an operating signal from one of the first receiving module 100 and the second receiving module 200. In addition, the switching controlling unit 400 may control the switching operation of the switching unit 300 using the stop signal or the operating signal.

The following Table 1 shows an operating frequency of each of WPC, PMA, and A4WP standards.

TABLE 1

| | WPC | PMA | A4WP |
|---|---|---|---|
| Operating frequency | 110-205 KHz | 230-282 KHz | 6.78 MHz or 13.56 MHz |

That is, the magnetic induction scheme (WPC and PMA) and the magnetic resonance scheme (A4WP) use different operating frequencies. As a result, the magnetic induction scheme and the magnetic resonance scheme are incompatible with each other. Therefore, the switching controlling unit 400 of the wireless charging device according to an exemplary embodiment of the present disclosure controls the switching operation of the switching unit 300, such that wireless charging may be performed in all of the respective schemes. The switching operation will be described below with reference to FIGS. 4 and 5.

Figure 2:
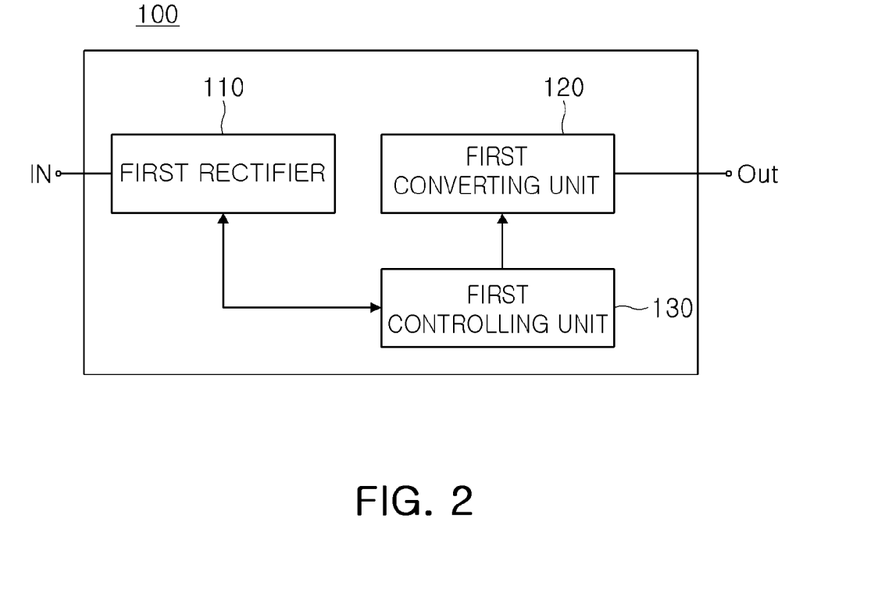
FIG. 2 is a block diagram illustrating a first receiving module of the wireless charging device shown in FIG. 1 in more detail.

FIG. 2 is a block diagram illustrating the first receiving module 100 of the wireless charging device shown in FIG. 1 in more detail.

Referring to FIG. 2, the first receiving module 100 may include a first rectifier 110 rectifying the power received from the outside, a first converting unit 120 converting the power received from the first rectifier 110 into an output voltage to provide the output voltage to the battery, and a first controlling unit 130 comparing an operating frequency of the received power and a preset first frequency to provide an operating signal or a stop signal to the switching controlling unit 400.

Figure 3:
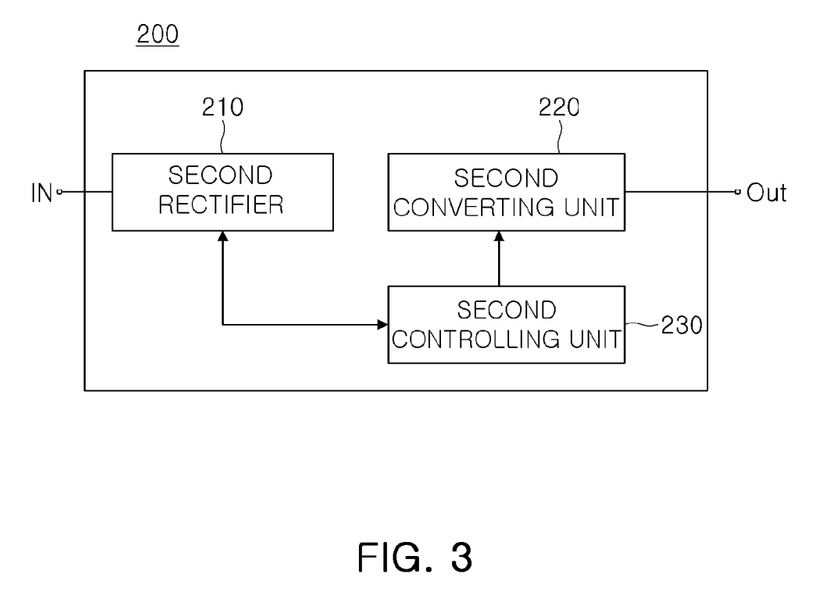
FIG. 3 is a block diagram illustrating a second receiving module of the wireless charging device shown in FIG. 1 in more detail.

FIG. 3 is a block diagram illustrating a second receiving module 200 of the wireless charging device shown in FIG. 1 in more detail.

Referring to FIG. 3, the second receiving module 200 may include a second rectifier 210 rectifying the power received from the outside, a second converting unit 220 converting the power received from the second rectifier 210 into an output voltage to provide the output voltage to the battery, and a second controlling unit 130 comparing an operating frequency of the received power and a preset second frequency to provide an operating signal or a stop signal to the switching controlling unit 400.

Figure 4:
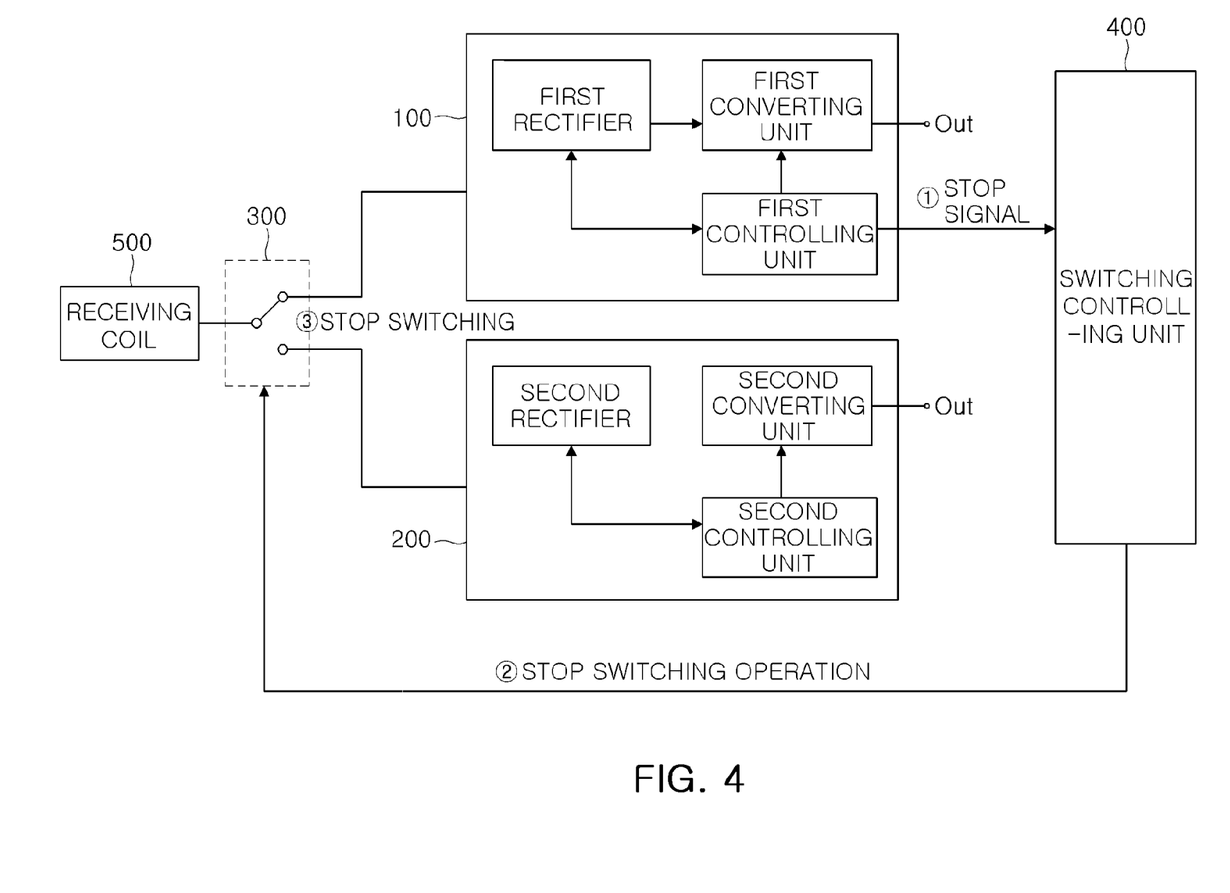
FIG. 4 is a schematic view illustrating a stop of a switching operation of the wireless charging device shown in FIG. 1.

FIG. 4 is a schematic view illustrating a stop of a switching operation of the wireless charging device shown in FIG. 1.

Figure 5:
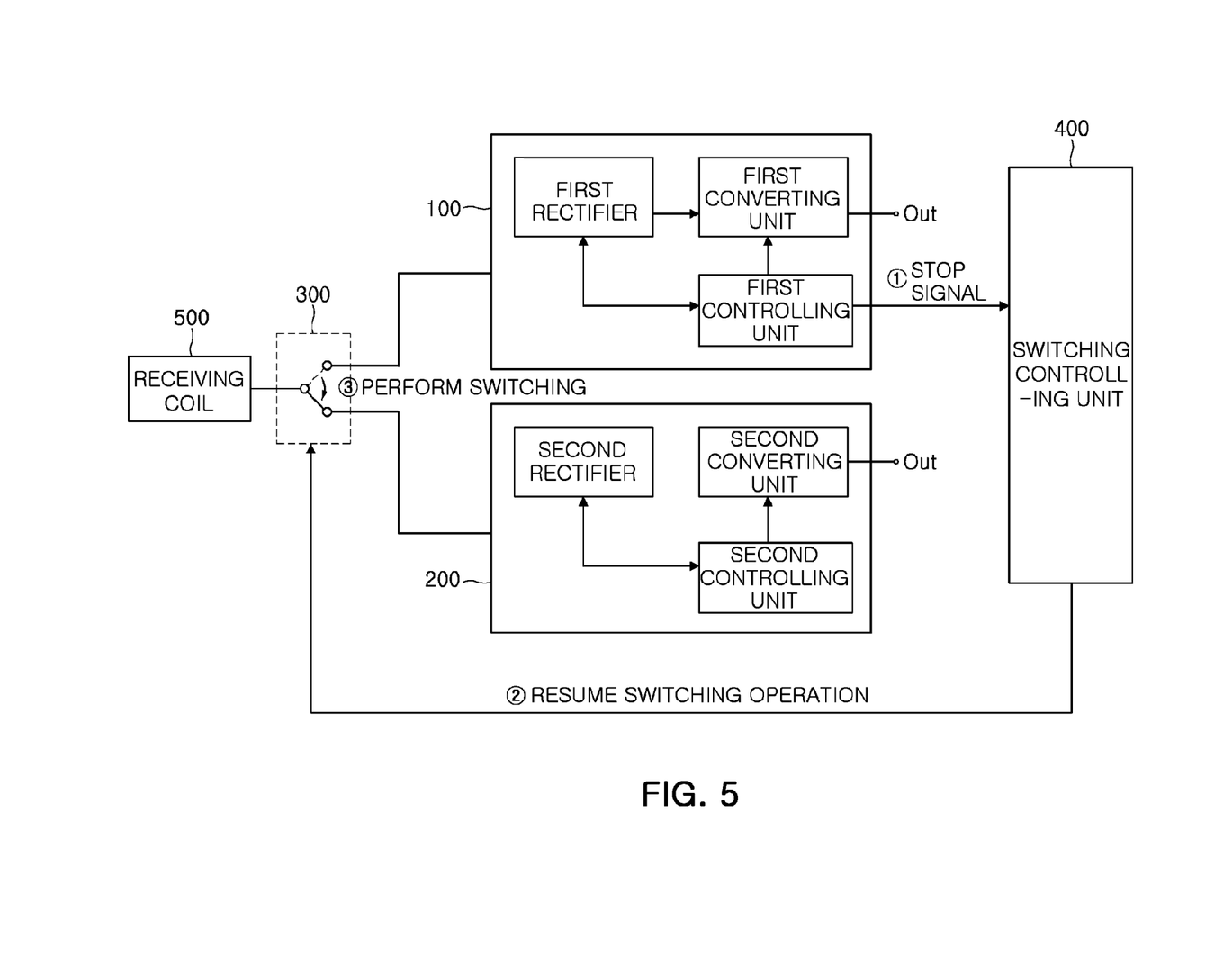
FIG. 5 is a schematic view illustrating a resumption of a switching operation of the wireless charging device shown in FIG. 1.

FIG. 5 is a schematic view illustrating a resumption of a switching operation of the wireless charging device shown in FIG. 1.

An operational principal capable of transmitting power selectively using a magnetic induction scheme and a magnetic resonance scheme will be described with reference to FIGS. 4 and 5.

Referring to FIG. 4, the switching unit 300 may perform a switching operation at a preset interval. First, a state in which the first receiving module 100 and the receiving coil 500 are connected to each other by the switching operation may be assumed.

That is, the receiving coil 500 may receive the power from the outside and provide the power to the first receiving module 100 connected to the receiving coil 500 by a current switching operation of the switching unit 300. In this case, the first receiving module 100 may compare an operating frequency band of the received power and a preset first frequency band and provide a stop signal to the switching controlling unit 400 when the two frequency bands match each other.

That is, in the case in which the operating frequency band and the first frequency band match each other, the first receiving module 100 may provide the stop signal to the switching controlling unit 400 and the switching controlling unit 400 may stop the switching operation of the switching unit 300 according to the stop signal. As a result, the switching operation is stopped in a state in which the first receiving module 100 is connected to the receiving coil 500, and the power received in the magnetic induction scheme may be wirelessly charged into the battery.

More specifically, the first controlling unit 130 of the first receiving module 100 may determine whether or not the operating frequency band of the power provided to the first rectifier 110 matches the preset first frequency band. Then, in the case in which the operating frequency band of the power provided to the first rectifier 110 matches the preset first frequency band, the first controlling unit 130 may provide the stop signal to the switching controlling unit 400 to thereby stop the switching operation of the switching unit 300. Next, the power received from the outside may be converted into the output voltage by the first converting unit 120 and the battery may be wirelessly charged using the output voltage.

Next, in this case, the first receiving module 100 may compare the operating frequency band of the received power and the preset first frequency band and provide an operating signal to the switching controlling unit 400 when the two frequency bands do not match each other.

Referring to FIG. 5, in the case in which the operating frequency band and the first frequency band do not match each other, the first receiving module 100 may provide the operating signal to the switching controlling unit 400 and the switching controlling unit 400 may resume the switching operation of the switching unit 300 according to the operating signal. As a result, the switching unit 300 may connect the receiving coil 500 and the first receiving module 100 to each other through the switching operation.

More specifically, the first controlling unit 130 of the first receiving module 100 may determine whether or not the operating frequency band of the power provided to the first rectifier 110 matches the preset first frequency band. Then, in the case in which the operating frequency band of the power provided to the first rectifier 110 does not match the preset first frequency band, the first controlling unit 130 may provide the operating signal to the switching controlling unit 400 to thereby connect the receiving coil 500 and the first receiving module 100 to each other.

Therefore, the wireless charging may be performed in both the magnetic induction scheme and the magnetic resonance scheme through the switching operation described above. Meanwhile, since an operation of the second receiving module 200 is the same as that of the first receiving module 100, a description thereof will be omitted.

Figure 6:
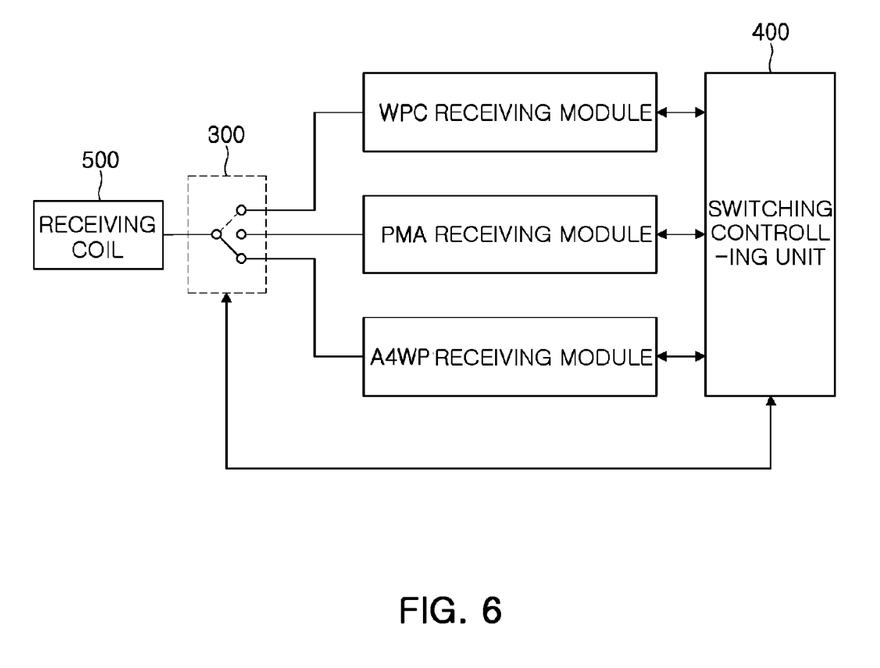
FIG. 6 is a block diagram illustrating a wireless charging device according to another exemplary embodiment of the present disclosure.

FIG. 6 is a block diagram illustrating a wireless charging device according to another exemplary embodiment of the present disclosure.

Referring to FIG. 6, the wireless charging device according to another exemplary embodiment of the present disclosure may include the receiving coil 500, a plurality of receiving modules receiving power received from the outside and charging a battery, the switching unit 300 performing a switching operation at a preset interval such that one of the plurality of receiving modules is selected, and a switching controlling unit 400 receiving a stop signal from the one of the plurality of receiving modules selected by the switching operation of the switching unit 300 to thereby stop the switching operation of the switching unit 300.

Each receiving module among the plurality of receiving modules may use a different communications standard. More specifically, the wireless charging device may include a WPC receiving module 600 and a PMA receiving module 700 using the magnetic induction scheme, and an A4WP receiving module 800 using the magnetic resonance scheme.

The switching unit 300 may connect the receiving coil 500 to one of the WPC receiving module 600, the PMA receiving module 700, and the A4WP receiving module 800 through the switching operation of the switching unit 300.

Since an operational principal capable of transmitting power selectively using the WPC receiving module 600, the PMA receiving module 700, and the A4WP receiving module 800 has been described above, a description thereof will be omitted.

Figure 7:
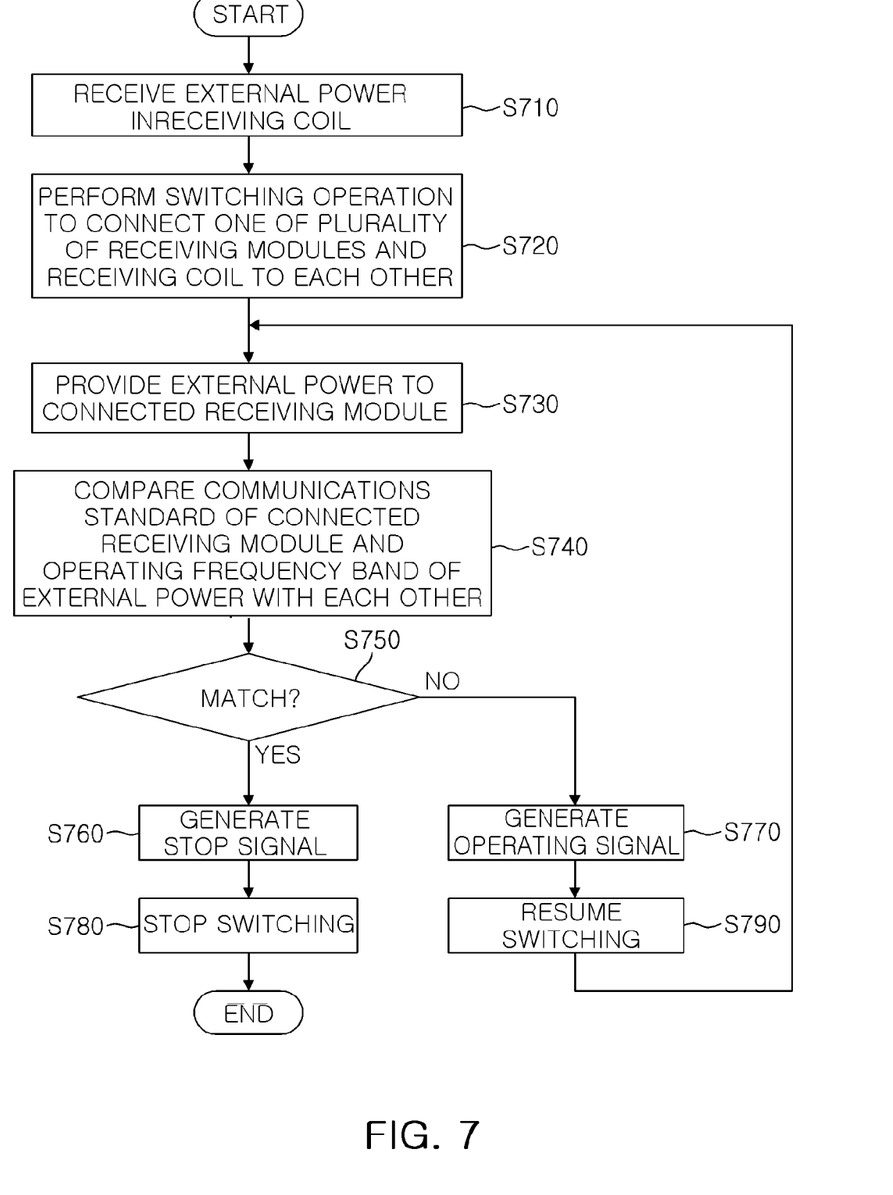
FIG. 7 is a flow chart illustrating a control method of the wireless charging device according to an exemplary embodiment of the present disclosure.

FIG. 7 is a flow chart illustrating a control method of the wireless charging device according to an exemplary embodiment of the present disclosure.

Referring to FIG. 7, the control method of the wireless charging device according to an exemplary embodiment of the present disclosure may include receiving external power in a receiving coil (S710), performing a switching operation at a preset interval to thereby connect one of a plurality of receiving modules and the receiving coil to each other (S720), receiving the external power from the receiving coil to thereby provide the external power to the connected receiving module (S730), comparing a communications standard of the connected receiving module and an operating frequency band of the external power (S740), determining whether or not a frequency band of the communications standard and the operating frequency band match each other (S750), generating a stop signal when the frequency band of the communications standard and the operating frequency band match each other (S760), and generating an operating signal when the frequency band of the communications standard and the operating frequency band do not match each other (S770).

In this case, as the communications standard, one of the A4WP standard, the WPC standard, and the PMA standard may be used, and each receiving module among the plurality of receiving modules may use a different communications standard.

Thereby, the wireless charging device according to an exemplary embodiment of the present disclosure may be operated in both of the respective technological standards of the magnetic resonance scheme and the magnetic induction scheme by receiving the stop signal or the operating signal from the plurality of receiving modules to control the switching operation of the switching unit 300.

As set forth above, according to exemplary embodiments of the present disclosure, the wireless charging device may be operated in respective technological standards of the magnetic resonance scheme and the magnetic induction scheme in the time division multiplexing (TDM) scheme through the switching operation.

While exemplary embodiments have been shown and described above, it will be apparent to those skilled in the art that modifications and variations could be made without departing from the spirit and scope of the present disclosure as defined by the appended claims.

What is claimed is:

1. A wireless charging device, comprising:
   a receiving coil;
   a first receiving module configured to receive power in a magnetic induction scheme from the receiving coil;
   a second receiving module configured to receive power in a magnetic resonance scheme from the receiving coil;
   a switching unit configured to repeatedly change between a first connection state, in which the first receiving module is electrically connected to the receiving coil, and a second connection state, in which the second receiving module is electrically connected to the receiving coil; and
   a switching controlling unit configured to receive a stop signal or an operating signal from whichever one of the first receiving module and the second receiving module is electrically connected to the receiving module,
   wherein the first receiving module is further configured to, in response to being connected to the receiving coil, compare an operating frequency band of the received power and a preset first frequency band, provide the stop signal to the switching controlling unit in response to the operating frequency band matching the first frequency band, and provide the operating signal to the switching controlling unit in response to the operating frequency band not matching the first frequency band, and
   the second receiving module is further configured to, in response to being connected to the receiving coil, compare an operating frequency band of the received power and a preset second frequency band, provide the stop signal to the switching controlling unit in response to the operating frequency band matching the second frequency band, and provide the operating signal to the switching controlling unit in response to the operating frequency band not matching the second frequency band.

2. The wireless charging device of claim 1, wherein the magnetic induction scheme is one of a wireless power consortium (WPC) standard and a power matters alliance (PMA) standard.

3. The wireless charging device of claim 1, wherein the magnetic resonance scheme is an alliance for wireless power (A4WP) standard.

4. The wireless charging device of claim 1, wherein the first receiving module comprises:
   a first rectifier configured to rectify the received power;
   a first converting unit configured to convert the power received from the first rectifier into an output voltage to provide the output voltage to the battery; and
   a first controlling unit configured to compare an operating frequency band of the received power and a preset first frequency band to provide one of the operating signal and the stop signal to the switching controlling unit.

5. The wireless charging device of claim 1, wherein the second receiving module comprises:
   a second rectifier configured to rectify the received power;
   a second converting unit configured to convert the power received from the second rectifier into an output voltage to provide the output voltage to the battery; and
   a second controlling unit configured to compare an operating frequency band of the received power and a preset second frequency band to provide one of the operating signal and the stop signal to the switching controlling unit.

6. A wireless charging device, comprising:
   a receiving coil;
   receiving modules configured to receive power from the receiving coil;
   a switching unit configured to repeatedly change a connection state determining which one of the receiving modules is electrically connected to the receiving coil; and
   a switching controlling unit configured to receive a stop signal or an operating signal from one of the receiving modules that is electrically connected to the receiving coil,
   wherein the first receiving module is configured to, in response to being connected to the receiving coil, compare an operating frequency band of the received power and a preset first frequency band, provide the stop signal to the switching controlling unit in response to the operating frequency band matching the preset first frequency band, and provide the operating signal to the switching controlling unit in response to the operating frequency band not matching the preset first frequency band, and the second receiving module is configured to, in response to being connected to the receiving coil, compare an operating frequency band of the received power and a preset second frequency band, provide the stop signal to the switching controlling unit in response to the operating frequency band matching the preset second frequency band, and provide the operating signal to the switching controlling unit in response to the operating frequency band not matching the preset second frequency band, wherein each receiving module among the receiving modules uses a different scheme.

7. The wireless charging device of claim 6, wherein the scheme is one of an alliance for wireless power (A4WP) standard, a wireless power consortium (WPC) standard and a power matters alliance (PMA) standard.

8. The wireless charging device of claim 6, wherein each of the receiving modules comprises:

a rectifier configured to rectify the received power;

a converting unit configured to convert the power received from the rectifier into an output voltage to provide the output voltage to the battery; and a controlling unit configured to provide one of the operating signal and the stop signal to the switching controlling unit according to an operating frequency band of the received power.

9. A control method of a wireless charging device, the control method comprising:

receiving external power in a receiving coil;

performing a switching operation at a preset interval to connect one of receiving modules and the receiving coil to each other;

receiving the external power from the receiving coil to provide the external power to the connected receiving module;

generating an operating signal or a stop signal by comparing a scheme of the connected receiving module and an operating frequency band of the external power; and receiving, by the switching controlling unit, the operating signal or the stop signal to control the switching operation, wherein the generating of the operating signal or the stop signal comprises generating a signal stopping the switching operation in response to a frequency band of the scheme matching the operating frequency band, and generating a signal resuming the switching operation in response to the frequency band of the scheme not matching the operating frequency band.

10. The control method of claim 9, wherein the scheme is one of an alliance for wireless power (A4WP) standard, a wireless power consortium (WPC) standard and a power matters alliance (PMA) standard, and each receiving module among the receiving modules uses a different scheme.

* * * * *